United States Patent [19]

Horyu

[11] 4,409,437
[45] Oct. 11, 1983

[54] APPARATUS FOR INDICATING TELEPHONE LINE STATE

[75] Inventor: Sakae Horyu, Yokohama, Japan

[73] Assignee: Canon Kabushiki Kaisha, Tokyo, Japan

[21] Appl. No.: 203,444

[22] Filed: Nov. 3, 1980

[30] Foreign Application Priority Data

Nov. 2, 1979 [JP] Japan .................... 54-141188

[51] Int. Cl.³ ........................ H04M 11/00
[52] U.S. Cl. .................. 179/2 DP; 179/81 C
[58] Field of Search .......... 179/81 C, 84 L, 1 MN, 179/2 DP, 27 FC, 175.24, 2 C

[56] References Cited

U.S. PATENT DOCUMENTS

| | | | |
|---|---|---|---|
| 3,141,068 | 7/1964 | Cleary et al. | 179/81 C |
| 3,502,812 | 3/1970 | Litofsky | 179/2 TV |
| 3,524,935 | 8/1970 | Gonsewski et al. | 179/2 DP X |
| 3,585,303 | 6/1971 | Chieffo | 179/84 L X |
| 3,614,324 | 10/1971 | Buzzard | 179/2 DP |
| 3,684,832 | 8/1972 | Marguth, Jr. | 179/2 DP |
| 3,745,251 | 7/1973 | Fretwell | 179/2 DP |
| 3,927,259 | 12/1975 | Brown | 179/1 MN |
| 3,944,752 | 3/1976 | Stearn et al. | 179/81 C |
| 4,169,217 | 9/1979 | Szanto et al. | 179/81 C |

FOREIGN PATENT DOCUMENTS 52-2206 1/1977 Japan .................... 179/84 L

Primary Examiner—Thomas W. Brown
Attorney, Agent, or Firm—Fitzpatrick, Cella, Harper & Scinto

[57] ABSTRACT

A power saving type indicator apparatus for a telephone line. Existence of one of input signals on a telephone line is indicated by actuating an indicator and existence of the other is indicated by deactuating the indicator so that the consumption of electric power in indicating the presence and absence of the input signals is reduced substantially. Furthermore, in connection with another indicator apparatus which indicates the presence of the other input signal by actuating the indicator, indication of signals is so controlled as not to indicate the same signal by actuating two indicators at the same time. Thereby, a further saving of electric power in indicating such signals will be attained. By saving the electric power consumed in signal indication in this manner, a substantial extention of useful life of such a communications system is attained.

5 Claims, 3 Drawing Figures

4,409,437

APPARATUS FOR INDICATING TELEPHONE LINE STATE

BACKGROUND OF THE INVENTION

1. Field of the Invention

The present invention relates to apparatus for indicating the state of a telephone line by indication means, and more particularly the present invention is directed to means for effecting power saving in such indicator apparatus.

2. Description of the Prior Art

In the art there is well known a full-duplex data transmitting and receiving system on a telephone line employing acoustic couplers provided in terminal apparatus at both ends of the telephone line. FIG. 1 is a schematic block diagram useful in understanding the common procedure of data transmission and reception in such a full-duplex system.

In FIG. 1, reference numerals 1 and 4 designate terminal equipment and numerals 2 and 3 denote acoustic couplers used for transmitting and receiving data. When some data has to be transmitted and received through the shown system, at first the calling subscriber originates a call directed to the called station by means of its telephone station and makes an arrangement by a voice communication. Then, the calling subscriber sets his or her handset on the acoustic coupler 2 and sets the calling-called switch to its "calling" position on the operation console of the coupler. On the other side, the called subscriber sets his or her handset on the acoustic coupler 3 and sets the switch to its "called" position. Upon a completion of the setting, a continuous signal having frequency $f_3$ is transmitted to the acoustic coupler 2 from the acoustic coupler 3 over the telephone line.

The acoustic couplers 2 and 3 have the same structure which is shown in detail in FIG. 2. A sound from the handset energizes a microphone 8 and is applied to a filter 6 through an amplifier 7. Thus, a received signal detection signal CD is obtained as an output from the filter 6. The signal CD is introduced into the terminal 1 or 4 to turn on the lamp $L_1$ or $L_4$ on the terminal. The received signal detection signal CD from the filter 6 is also applied to a modulator 11 to generate a continuous signal of frequency $f_1$ or $f_3$ which enters the acoustic coupler 3 or 2 at the other station over the telephone line.

As readily understood from the foregoing, the turning-on of lamps $L_1$ and $L_4$ at both terminals 1 and 4 indicates that the communications system is prepared for start of a communication. Therefore, after the turning-on of the lamps at both stations, a communication can be started with a so-called frequency shift signal FS of frequencies $f_1$ and $f_2$ at the calling party and a frequency shift signal FS of $f_3$ and $f_4$ at the called party.

However, in the above process required for preparing the system for start of a communication, note should be taken of the fact that up to the end of the arrangement step, transmission of all the necessary information must be carried out solely with voice. This fact means that deaf-and-dumb people can never prepare the system for start of comunication. For such people, therefore, it has been proposed to provide the acoustic couplers 2 and 3 with particular lamps $L_2$ and $L_3$ for indicating the state of a telephone line. In the known system for this purpose, the particular indicator lamps $L_2$ and $L_3$ are turned on and off in accordance with a ringing tone, busy tone, etc. In general, such communications system is designed to be portable so that a deaf-and-dumb person may carry it with him and in many cases there is used a battery as the power source for the portable system. As the indicator lamps there are usually used light emitting diodes (LEDs) or the like because of their high speed in response. However, use of such indicator lamps involves a large consumption of electric power. Therefore, the useful lifetime of the battery is shortened. This is a significant drawback of such communication system hitherto known.

SUMMARY OF THE INVENTION

Accordingly, it is an object of the invention to provide indicator apparatus useful for the above-mentioned type of communications system which indicates an instant state of a telephone line by indicator means.

It is another object of the invention to provide indicator apparatus which enables duplication of indication to be avoided in connection with another apparatus involved in the communications system, thereby saving electric power.

It is a further object of the invention to provide indicator apparatus which enables the useful life of the communications system to be extended by reducing the power consumption in the apparatus.

BRIEF DESCRIPTION OF THE DRAWINGS

Other and further objects, features and advantages of the invention will appear more fully from the following description taken in connection with the accompanying drawings, in which.

DESCRIPTION OF THE PREFERRED EMBODIMENTS

Figure 1:
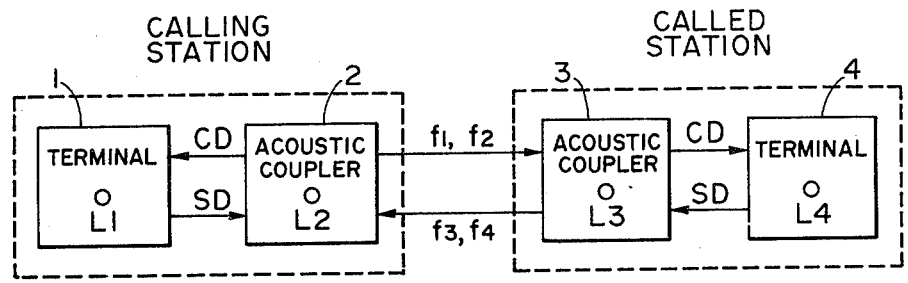
FIG. 1 is a schematic block diagram of a communications system to which the present invention is applicable.
Figure 2:
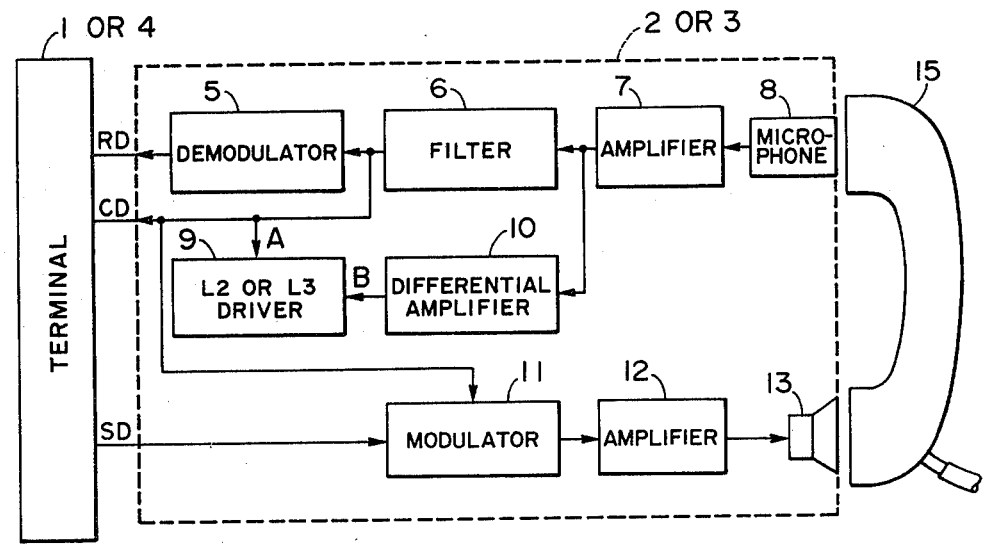
FIG. 2 is a schematic block diagram showing the structure of an acoustic coupler used in the communications system.

Referring first to FIG. 2 the operation of the acoustic coupler will be described in detail.

As previously described, the microphone 8 receives sound from the telephone handset 15. The received sound signal is amplified by the amplifier 8 and then connected to filter 6 and differential amplifier 10. The filter 6 passes only such signals having frequencies $f_1$ and $f_2$ at the calling station and those having frequencies of $f_3$ and $f_4$ at the called station. This change-over of the passing bands is effected in response to the above mentioned "calling-called" switch provided on the operation panel. The signal passed through the filter 6, namely frequency shift signal FS, is demodulated by a demodulator 5 to form a pulse signal, namely, a received signal RD which is applied to the terminal 1 or 4. On the other hand, from the signal applied to the differential amplifier 10 only those signal components which are higher than a certain determined level are picked up to exclude noise or the like. The signal thus obtained from the differential amplifier 10 is applied to a driver 9 for lamp $L_2$ or $L_3$. Therefore, all the signals formed from the sound received by the microphone 8 and higher than the determined level turn the lamp $L_2$ or $L_3$ on.

When data signal SD is applied to a modulator 11 from the terminal 1 or 4, it is modulated by the modulator into frequency shift signal FS of frequencies $f_1$ and $f_2$ at the calling station and that of frequencies $f_3$ and $f_4$ at the called station. After being amplified by the amplifier 12, the signal FS is converted into sound by the loudspeaker 13 and then sent over the telephone line through the telephone handset.

Figure 3:
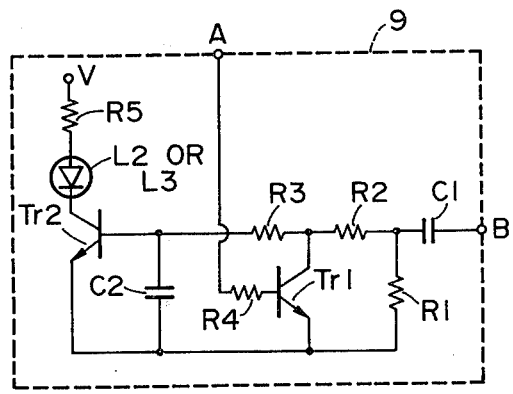
FIG. 3 is a circuit diagram showing an embodiment of the indicator circuit used in the communications system according to the invention.

Since the acoustic couplers 2 and 3 operate in the manner described above and the indicator lamps $L_1$ and $L_2$ in the terminals 1 and 4 are turned on in response to the generation of received signal detection signal CD, it is no longer necessary to indicate the detection of the received signal by turning the lamps $L_2$ and $L_3$ on in the couplers 2 and 3. Therefore, it is made possible to turn the lamps $L_2$ and $L_3$ off by the received signal detection signal CD employing a circuit as shown in FIG. 3 for the purpose of power saving. Lamps $L_2$ and $L_3$ become turned on only when, for example, a ringing tone or busy tone is generated from the telephone handset 15 before the output of received signal detection signal CD.

The operation of the circuit shown in FIG. 3 will be discussed.

A series of pulses obtained as an output signal from the differential amplifier 10 is introduced into the input terminal B of the circuit and then applied to the base electrode of transistor Tr2 through a connection circuit constituted by capacitor C1 and resistor R1 and through an integrator circuit. Since the transistor Tr2 is made conductive by this application of the pulse series, the lamp $L_2$ or $L_3$ receives a voltage V so that in turns on. The integrator circuit between the connection circuit C1, R1 and the base of transistor Tr2 comprises resistors R2, R3 and a capacitor C2 to transform the input voltage in the form of pulse into a DC voltage. By this conversion of voltage form, the brightness of light emitted from the light emitting diodes or the like constituting the lamps $L_2$ and $L_3$ is increased.

The circuit shown in FIG. 3 further comprises transistor Tr1 the collector electrode of which is connected to the connection between the resistors R2 and R3 contained in the integrator circuit mentioned above. With this arrangement, when a received signal detection signal CD is applied to the base of transistor Tr1 from the input terminal A through resistor R4, the transistor Tr1 is turned on and therefore the connection point between the resistors R2 and R3 assumes a position as if grounded through the transistor Tr1. In this position, the pulse series signal applied to the input terminal B can no longer reach the base of transistor Tr2 and therefore the display lamp $L_2$ or $L_3$ turns off.

In this manner, according to the embodiment of the present invention, the indicator lamp $L_2$ ($L_3$) provided on the acoustic coupler for indicating the state of the telephone line is turned on only before the reception of a frequency shift signal FS, and turned off when the lamp $L_1$ ($L_4$) on the terminal is turned on by the reception of the signal FS. In other words, lamp $L_2$ ($L_3$) continues to be on only during the time of signals other than data signal being received. Thus, duplication of indication of the state of the telephone line by both of lamps $L_1$ ($L_4$) and $L_2$ ($L_3$) is avoided, which in turn prevents the electric power from being wastefully consumed by the indicator lamps. Therefore, according to the invention, the useful life of a battery mounted, for example, in the acoustic coupler circuitry will be expanded substantially as compared with the prior art system.

While a preferred embodiment of the invention has been described using specific terms, such description is for illustrative purpose only, and it is to be understood that changes and modifications may be made without departing from the spirit and scope of the following claims.

What I claim is:

1. An apparatus for indicating states of a telephone line, comprising:
   means for receiving a plurality of signals from the telephone line in forms distinguishable one from another;
   means for indicating a first state of the than a predetermined level is included in said plurality of signals; and
   means for disabling said indicating means when said receiving means receives a signal having a predetermined frequency, and for providing a signal causing an external unit connected to said apparatus to indicate that the telephone line is in a second state different from the first state.

2. An apparatus for indicating states of a telephone line according to claim 1 wherein, said indicating means includes a light emitting device which indicates one state by turning on said light emitting device and another state by turning off said light emitting device.

3. An apparatus for indicating states of a telephone line, comprising:
   means for converting audio information received from a receiver of a handset into electric signals;
   means for selecting a signal having a predetermined frequency from said electric signals, and for providing said selected signal to indication means;
   said indication means provided for indicating receipt of signals, said indication means including a display lamp for indicating a first state of the telephone line by turning on said display lamp when receipt of said electric signals is indicated, and for indicating a second state of the telephone line by turning off said display lamp when receipt of said selected signal is indicated; and
   means for modifying said selected signal to provide a signal to an external unit connected to said apparatus wherein said unit is provided with a lamp which indicates the second state when said provided signal is received by said unit.

4. An apparatus for indicating states of a telephone line comprising:
   acoustic input means acoustically connected to a receiver of a handset;
   acoustic output means acoustically connected to a transmitter of a handset;
   input terminal means for electrically connecting said apparatus to an external unit;
   output terminal means for electrically connecting said apparatus to said external unit;
   means for causing said acoustic output means to provide information received from said external unit to the handset;
   means for selecting a signal having a predetermined frequency from received acoustic information, and for modifying said selected signal to provide a signal to said external unit, said input terminal means, and said output terminal means; and
   single means for causing a display lamp to be turned on in response to said provided signal, and for causing said display lamp to be turned off in response to said selected signal.

5. An apparatus for indicating states of a telephone line according to claim 4, wherein said acoustic input means includes a microphone for converting said received acoustic information into electric signals, said acoustic output means includes a speaker for converting said electric signals into acoustic information, said input terminal means includes a modulator for modulating a signal received from said external unit to provide a modulated signal, said output terminal means includes a demodulator for demodulating said selected signal provided by said selecting means, said selecting means includes a filter for selecting a signal having a predetermined frequency band from said converted electric signals, and said single means includes a light emitting device.

* * * * *

UNITED STATES PATENT AND TRADEMARK OFFICE
CERTIFICATE OF CORRECTION

PATENT NO.  :  4,409,437
DATED       :  October 11, 1983
INVENTOR(S) :  SAKAE HORYU It is certified that error appears in the above-identified patent and that said Letters Patent is hereby corrected as shown below:

Col. 3, line 32, change "in" to --it--.

Col. 4, line 15 (Claim 1, line 6), after "the" insert

--telephone line when a signal of a higher level--.

*Signed and Sealed this*

*Thirty-first* Day of *January 1984*

[SEAL]

*Attest:*

GERALD J. MOSSINGHOFF

*Attesting Officer*  *Commissioner of Patents and Trademarks*